United States Patent [19]
Hayes II et al.

[11] Patent Number: 5,930,941
[45] Date of Patent: Aug. 3, 1999

[54] FISHING LURE HAVING THREE POINTS OF SUPPORT

[76] Inventors: Ed Lymon Hayes II, deceased, late of Owasso, Okla.; by DeLoris Mae Hayes, legal representative, 408 S. Birch; Howard Duke Davenport, II, 703 N. Birch, both of Owasso, Okla. 74055

[21] Appl. No.: 08/799,555

[22] Filed: Feb. 13, 1997

[51] Int. Cl.$^6$ ................................................. A01K 85/00
[52] U.S. Cl. .......................................... 43/42.13; 43/42.11
[58] Field of Search ............................... 43/42.11, 42.13, 43/42.26, 42.27

[56] References Cited

U.S. PATENT DOCUMENTS

| | | | |
|---|---|---|---|
| 588,729 | 8/1897 | Harris . | |
| 1,923,840 | 8/1933 | Ozburn | 43/42.13 |
| 2,768,466 | 10/1956 | Reed | 43/42.39 |
| 3,753,310 | 8/1973 | Werner | 43/42.39 |
| 4,428,144 | 1/1984 | Dickinson | 43/44.96 |
| 4,450,645 | 5/1984 | Ancona | 43/42.25 |
| 5,203,105 | 4/1993 | Bond et al. | 43/42.39 |
| 5,349,776 | 9/1994 | Lucas | 43/42.39 |
| 5,524,378 | 6/1996 | Hood | 43/42.31 |

*Primary Examiner*—Kurt Rowan
*Attorney, Agent, or Firm*—Head, Johnson & Kachigian

[57] ABSTRACT

A fishing lure to be drawn through a body of water by a fishing line has a body with the shank of a hook extending from the body rearward end, the hook having a curved portion terminating in a pointed end with the curved portion being substantially paralleled to the shank portion and the pointed end extending towards the body. An eyelet is secured to the body adjacent the forward end and top surface to receive a fishing line. A pair of deflectable arms are secured at their inner ends to the body, the arms extending downwardly and rearwardly from the body, the outer ends of the arms being spaced away from each other a distance substantially greater than the body width, the arms being sufficiently stiff so as to remain substantially undeflected as the lure is drawn through a body of water. A spinner is rotatably affixed to the outer end of each of the arms. The outer ends of the arms and the body nose portion form three triangularly positioned support points that support the lure body if the lure contacts the bottom surface of a body of water or an object, such as a log or brush within a body of water, the shank of the hook extending upwardly at an angle with respect to the horizontal of about 30° to 60°.

6 Claims, 2 Drawing Sheets

FISHING LURE HAVING THREE POINTS OF SUPPORT

REFERENCE TO PENDING APPLICATIONS

This application is not related to any pending applications.

REFERENCE TO MICROFICHE APPENDIX

This application is not referenced in any microfiche appendix.

BACKGROUND OF THE INVENTION

This invention relates to a fishing lure and particularly a fishing lure having improved resistance against being entangled with the bottom surface of a body of water through which the lure is moved.

A most popular sport in the United States, and many other countries of the world, is fishing with the use of artificial lures that are cast and retrieved using a rod and a reel. Lures are configured to replicate, as they move through water, the appearance and action of live food to which a game fish is attracted. Artificial lures can also be used by trolling behind a slow moving boat.

In either type of fishing, one problem with them is the propensity of lures to become entangled with objects on the bottom surface of the body of water in which they are used. The lure of this disclosure includes a three-point triangular landing pattern. That is, if the lure engages the bottom surface of a body of water or is allowed to settle to the bottom surface, the hook is upwardly extended in a direction away from the bottom surface to thereby substantially reduce the possibility of the lure being entangled on the bottom surface or on objects that rest on the bottom surface.

For background information relating to fishing lures having some characteristics similar to the lure of the present disclosure, but which do not reveal the new and novel elements of the fishing lure as will be hereinafter described, reference can be had to the following U.S. Pat. Nos.:

| PAT. No. | INVENTOR | TITLE |
| --- | --- | --- |
| 588,729 | Harris | Artificial Fish Bait |
| 2,768,466 | Reed | Fish Lure |
| 3,753,310 | Werner | Fish Lure |
| 4,428,144 | Dickinson | Fishing Device |
| 4,450,645 | Ancona | Bottom Fishing Lure |
| 5,203,105 | Bond et al | Horse Head Fishing Lure |
| 5,349,776 | Lucas | Artificial Fishing Lure |
| 5,524,378 | Hood | Fishing Lure With Rattle Means |

BRIEF SUMMARY OF THE INVENTION

This invention provides a fishing lure having a structure arranged to substantially reduce the possibility of the fishing lure being entangled on the bottom surface of a body of water in which it is used.

The fishing lure is of the type designed to be drawn through a body of water by pulling force applied to a fishing line. The lure has a body having a forward end, a rearward end, a top surface, a bottom surface and opposed sides defining a body width. The lure has a nose portion formed at the intersection of the forward end and bottom surface and has an eyelet secured to the body on the top surface, the forward end or preferably, adjacent the forward end and top surface, the eyelet being adapted to receive a fishing line.

A hook is secured to the body. The hook has a shank portion extending from the body rearward end and a curved portion that terminates in a pointed end. The pointed end is substantially paralleled to the hook shank portion and, in a preferred arrangement, the pointed end generally extends in the direction towards the eyelet affixed to the lure body.

A pair of deflectable arms, preferably made of flexible metal wire but which can be made of flexible but relatively stiff plastic monofilament, each has an outer end and an inner end. The inner end of each of the arms is secured to the body. Each arm extends downwardly and rearwardly from the body with the outer ends of the arms being spread apart from each other and spaced away from each other a distance substantially greater than the width of the body. The arms, though deflectable, are sufficiently stiff so as to remain substantially undeflected as the lure is drawn through a body of water.

A spinner is rotatably affixed to each of the arms adjacent the outer ends thereof. The spinners, when the lure is drawn through water, spin in an area below and to either side of the fish hook shank and curved portion.

The hook curved portion is adaptable to receive a puncturable bait thereon, such as a flexible plastic bait. When a puncturable bait is used on the hook, the spinners spin below and to either side of the puncturable bait.

The lure is configured so that the outer ends of the opposed arms and the body nose form a triangular patterned three-point landing system. That is, when the lure is permitted to descend in a body of water to the water bottom surface, the lure engages the bottom surface in a triangular support pattern, the shank of the hook extending upwardly relative to the bottom surface at an angle from about 30° to 60°. In this way the hook, and particularly the pointed end portion, is held away from the bottom surface and in an angular position so that it is least likely to engage the bottom surface or objects resting on the bottom surface.

The lure may have a specific gravity greater or less than that of water, that is, the lure may be configured as a deep runner or as a floater.

A better understanding of the invention will be obtained from the following description of the preferred embodiments and the claims, taken in conjunction with the attached drawings.

DESCRIPTION OF THE DRAWINGS

FIG. 1 shows in dotted outline a puncturable bait secured to the lure fish hook.

FIG. 1 shows the lure from a top view as it is pulled through water or as it would appear when resting on a bottom surface of a body of water.

FIGS. 1, 2 and 3 show the lure as it would appear as it is pulled through a body of water, that is, with spinners attached to the outer arms of the lure as they would extend rearwardly of the lure as the lure moves through the water.

DETAILED DESCRIPTION OF THE PREFERRED EMBODIMENTS

Figure 1:
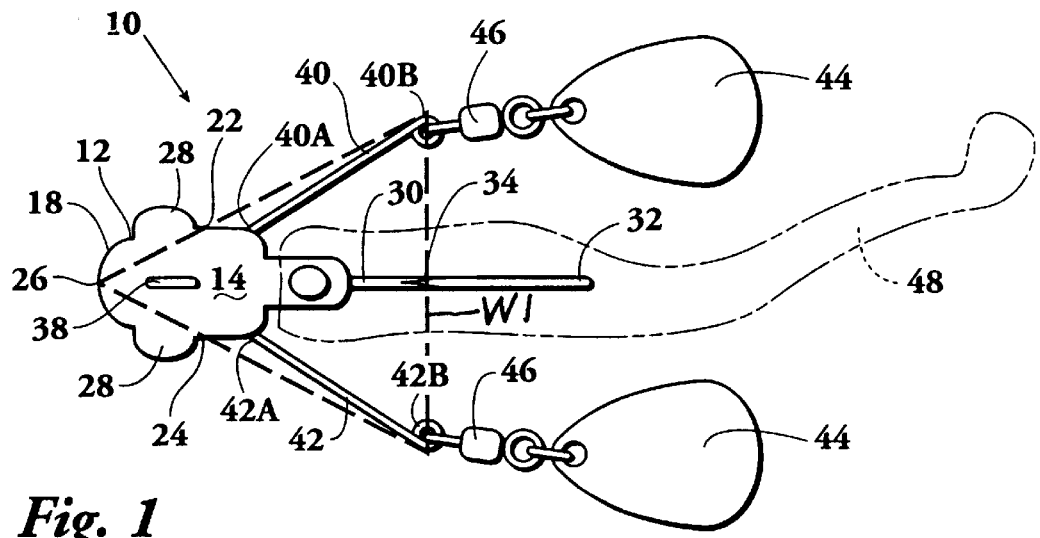
FIG. 1 is a top plan view of a fishing lure that incorporates the principals of this invention.
Figure 2:
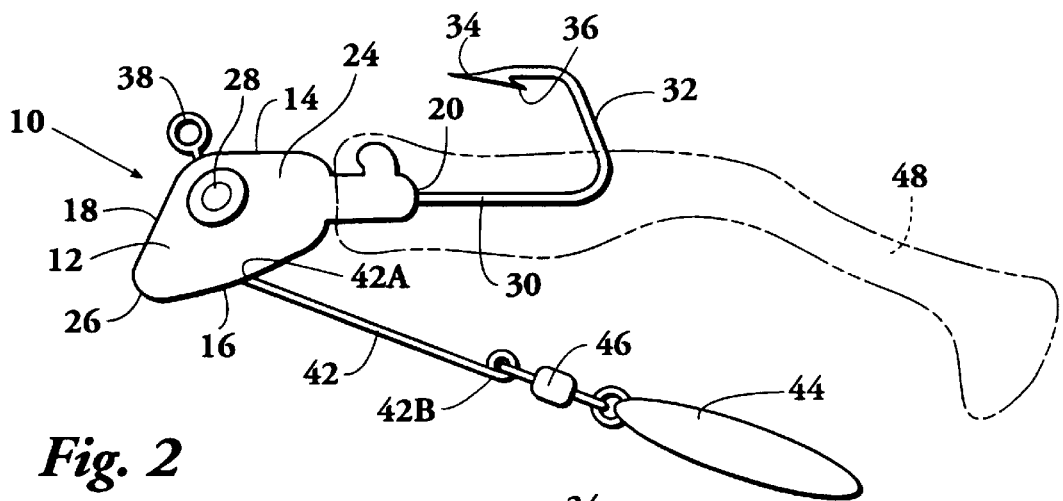
FIG. 2 is an elevational side view of the lure of FIG. 1.
Figure 3:
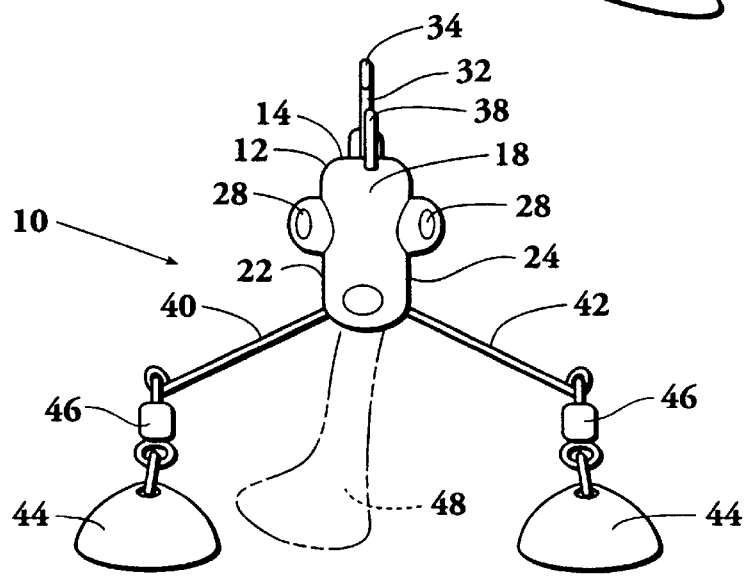
FIG. 3 is a front view of the lure of FIG. 1.

Referring to the drawings and first to FIGS. 1 through 3, a first embodiment of the invention is illustrated. A fishing lure is generally indicated by the numeral 10 and includes a body 12. Body 12 is preferably weighted and may be formed of dense plastic, lead or similar materials. Body 12 has a top surface 14, a bottom surface 16, a front end 18, a rearward end 20 and opposed sides 22 and 24. At the juncture of bottom surface 16 and front end 18, a nose 26 is formed.

Body 12 is preferably configured to replicate at least a head portion of a representative marine life, such as a fish, frog or the like and therefore, may optionally have selectable features such as eyes 28 but the actual design and appearance of body 12 can vary greatly while still encompassing the invention.

Extending from the rearward end 20 of body 12 is a fish hook that includes a shank portion 30 and a curved portion 32. The curved portion terminates with a pointed end 34. The fish hook as illustrated shows the curved portion 32 with an intermediate straight portion, however, this is optional as the hook can include a continually curved portion in the nature of the standard fish hook. Adjacent the pointed end 34 is a barb 36 that is typical of fish hooks.

The inner end of shank 30 (not seen) is received within and secured to body 12.

Affixed to body 12 on top surface 14 or front end 18, or where top surface 14 joins front end 18, is an eyelet 38 that is of the type commonly employed for attaching a fishing line (not seen) by which the lure is pulled through a body of water.

Affixed to the lure body are a pair of arms 40 and 42 each having an inner end 40A and 42A respectively. Inner ends 40A and 42A are each secured to body 12. The arms 40 and 42 extend downwardly and rearwardly with respect to the body and in directions so that the outer ends 40B and 42B are spaced apart a width W1 from each other a distance greater than the width of the body.

A spinner 44 is attached to the outer end of each of the arms. In the illustrated arrangement, the outer ends 40B and 42B of the arms are each provided with an integral eyelet that receives the forward end of a swivel 46. Spinners 44 are secured to the rearward end of swivels 46. Swivels 46 are of the type commonly employed on fishing lures that provide a bearing arrangement to allow the rearward portion to rotate relative to the front portion and thereby to allow spinners 44 to rotate with respect to the outer eyelet ends 40B and 42B of arms 40 and 42 respectively.

The inner ends 40A and 42A of the arms are each secured to body 12 such as by being encapsulated in the body. It can be seen that in manufacturing the lure, arms 40 and 42 may be formed of the same piece of deflectable wire bent in a V-shape, the bite of the V being encompassed within body 12.

The hook made up of portions 30, 32 and 34 is adaptable to receive a puncturable bait thereon. The puncturable bait can be formed of soft flexible plastic. One form of puncturable bait is shown in dotted outline and indicated by the numeral 48. A wide variety of different designs of flexible soft puncturable plastic baits are available on the market and the outline of the bait indicated by numeral 48 is merely representative of a style of bait that can be employed.

When the lure of FIGS. 1 through 4 is pulled through the water the relationship of the body, eyelet 38 and downwardly extending arms 40 and 42 is such that the lure moves in a vertical plane taken through the body, the plane encompassing the hook shank portion 30 and curved portion 32. This keeps the pointed end 34 of the hook above the body as the lure moves through water to thereby reduce the likelihood of the hook being snagged on an object in the water. At the same time the pointed end 34 of the hook is freely exposed so that if the lure is struck by a fish it is free to unobstructively engage the mouth of the striking fish.

Figure 7:
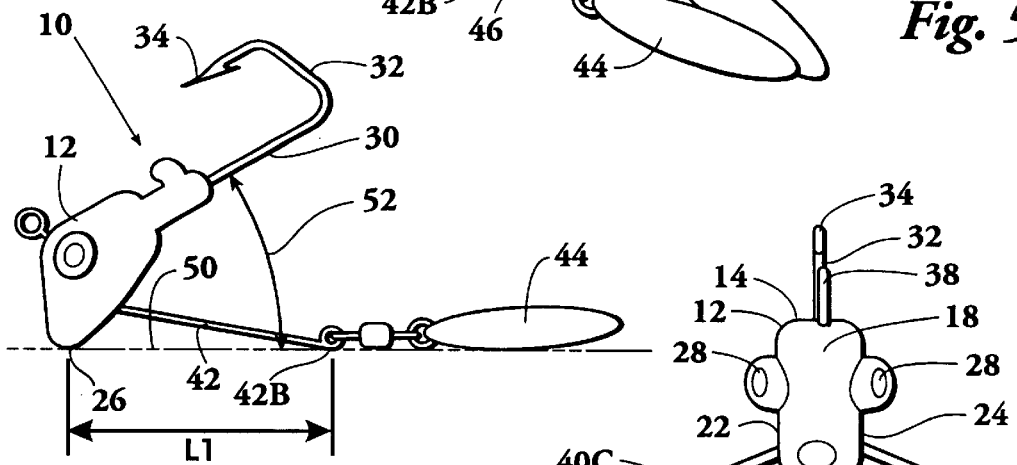
FIG. 7 is a reduced scale view of the embodiment as shown in FIGS. 1 through 3 with the lure resting on the bottom surface of a body of water, illustrating the employment of a triangular landing pattern that supports the shank of the hook at an angle between 30–60° with respect to the bottom surface, to thereby illustrate the effectiveness of the lure in reducing the chance of entanglement of the hook with the bottom surface or objects resting on the bottom surface.

Lures frequently become entangled with the bottom of a body of water or objects on the bottom when a lure is permitted to settle downwardly. In bait casting, a common technique is to cast the lure onto the surface of a body of water and allow the lure to settle to the bottom and then retrieve the lure by applying force on the fishing line to move the lure upwardly off the bottom and in the direction towards the fisherman. Sometimes this action is repeated, allowing the lure to settle to the bottom and then to move the lure off the bottom several times in succession so as to simulate the action of marine life that would likely attract a game fish. When the lure settles to the bottom there is an increased possibility of the lure being entangled with the bottom of the body of water or objects resting on the bottom. When lures are on the bottom or adjacent the bottom they most frequently become entangled. When this happens, it is normally difficult to extract the lure and frequently the lure is lost. An important aspect of the lure of this invention is the reduced likelihood of the lure being entangled with the bottom of a body of water or objects that rest on the bottom. When the lure settles to the bottom it engages the bottom surface in a triangular landing pattern, the triangular landing pattern being formed by the body nose 26 and the outer ends 40B and 42B of the arms. FIG. 7 shows in reduced scale lure 10 resting on bottom 50 of a body of water. The triangular landing pattern has a length from the lure nose 26 to the outer ends 40B and 42B of arms 40 and 42 that is greater than the length of body 12 as seen in FIG. 7 and a width that is the distance between the outer ends 40B and 42B of the arms as seen in FIG. 3 that is greater than the body width, thus providing a relatively large triangular pattern of support exceeding the lure body length and width. This three-point landing pattern causes the lure to be positioned so that the shank 30 of the fish hook extends upwardly at an angle 52 relative to bottom 50, that is, between about 30° and 60°. With the hook extended in this angle the hook is positioned in a manner that substantially reduces the possibility of engagement with bottom 50 or with any object such as sunken limbs, branches or other items that might rest on the bottom.

Figure 4:
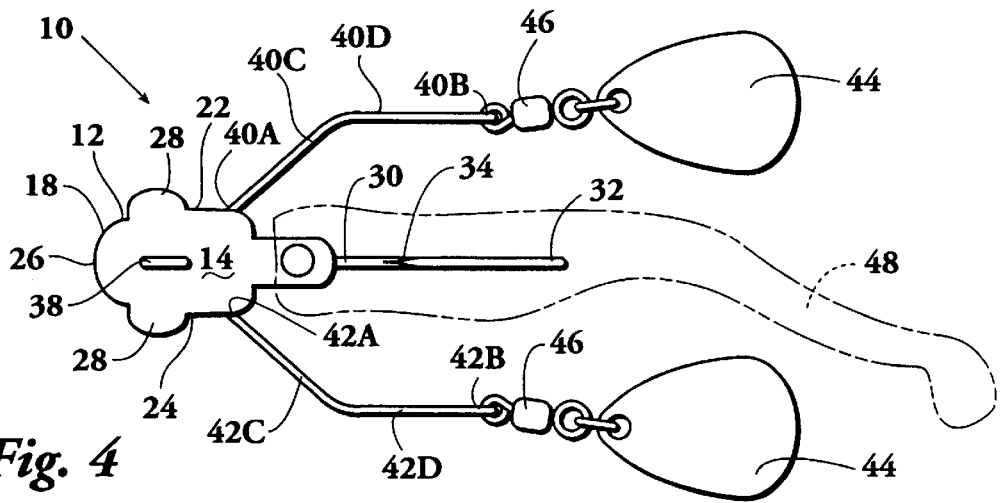
FIG. 4 is a top plan view of an alternate embodiment of the invention in which the arms each have an inner angular portion and an outer straight portion that is paralleled to the hook shank.
Figure 5:
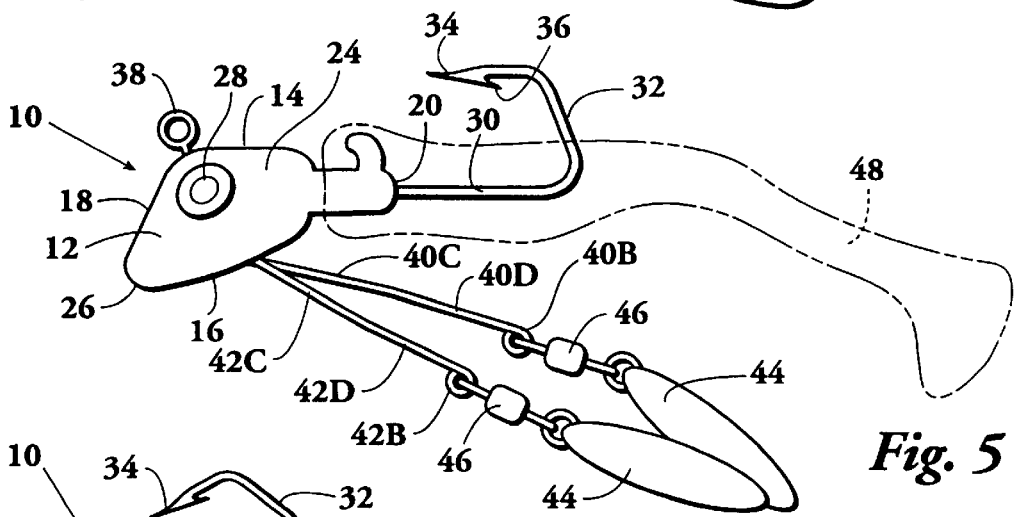
FIG. 5 is an elevational side view of the embodiment of FIG. 4.
Figure 6:
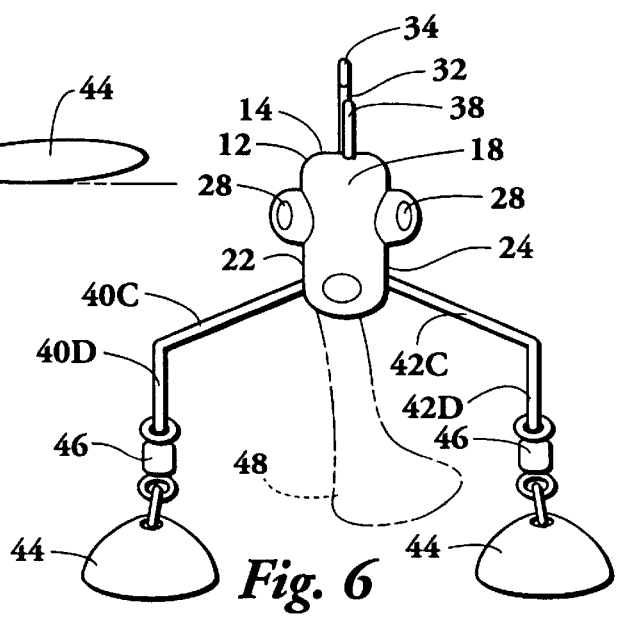
FIG. 6 is a front elevational view of the embodiment of FIGS. 4 and 5.

FIGS. 4, 5 and 6 show an alternate embodiment of the invention where substantially all the elements are duplicative of the embodiment of FIGS. 1, 2 and 3, the only difference being a variation in the configuration of the arms. Whereas in FIGS. 1, 2 and 3, arms 40 and 42 are straight, in the embodiment of FIGS. 4, 5 and 6 each of the arms is formed of two integral portions, a first angular portion indicated by the numeral 40C and 42C and a rearwardly extending integral straight portion 40D and 42D. The integral portions 40C and 42C extend downwardly and rearwardly and divergently from the body as in FIGS. 1, 2 and 3, but perhaps at a slightly increased angle of divergence, whereas the outer portions 40D and 42D are preferably paralleled to each other and paralleled to the shank 30 and curved portion 32 of the fish hook. The outer ends 40B and 42B of the arms have swivels 46 and spinners 44 as has been previously described. The embodiment of FIGS. 4, 5 and 6 provides a three-point landing pattern as has been described with reference to FIGS. 1, 2 and 3 with the advantages of such landing pattern of substantially reducing the possibility of the lure becoming entangled on the bottom of a body of water or objects resting on the bottom surface.

Arms 40 and 42 are preferably made of deflectable metal wire, such as flexible stainless steel wire, however the arms are preferably configured so that they do not deflect during normal movement through water; the arms being deflectable only if engaged by the mouth of a fish or if the lure is pulled between adjacent objects within the water that require the arms to deflect inwardly so as to permit passage of the lure. Otherwise, the arms remain in their fixed position so as to keep the spinners properly spaced in relationship to the fish hook. While the arms 40 and 42 are preferably of deflectable steel wire they could be made of strong relatively stiff monofilament plastic or fiberglass as long as the arms, if made of plastic or fiberglass remain substantially in their fixed position during normal movement through the water and when the lure rests on the bottom of a body of water.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A deep water fishing lure for use in a body of water having a bottom, the lure being drawn through the water by pulling force supplied by a fishing line, comprising:

a lure body of specific gravity heavier than water so that the lure tends to sink when pulling force is reduced and having a forward end with a nose portion and a rearward end defining a body length, a bottom surface and opposed sides defining a body width;

a hook having a shank portion, the shank portion having a forward end received by said lure body, the shank portion extending from said lure body rearward end, the hook having a curved portion terminating in a pointed end above said body, the pointed end being at least substantially paralleled to the shank portion and extending in a direction towards said lure body;

an eyelet extending from said lure body adjacent said forward end and adaptable to receive by a fishing line;

a pair of deflectable arms, each heaving an inner end and an outer end, the inner end of each arm being secured to said lure body, each arm extending downwardly and rearwardly from said lure body, the outer ends of the arms being spaced away from each other by a distance greater than said body width, the outer ends of the arms extending rearwardly of said lure body; and a spinner rotatably affixed to each said arm at said outer end thereof, the spinners being positioned rearwardly of said lure body, said lure body nose portion and said outer ends of said arms forming a triangular pattern of support points that when pulling force is reduced and the lure sinks, the support points engage a bottom of a body of water and said lure body is supported with said hook shank portion extending upwardly at an angle from about 30° to about 60° relative to the bottom of the body of water with said support points provided by said outer ends of said arms being rearwardly of said body providing said width that dimensionally exceeds said body width and a length from said nose portion to the outer ends of said arms being greater than said body length.

2. A fishing lure according to claim 1 wherein said arms are formed of wire.

3. A fishing lure according to claim 1 wherein each of said arms has a forward portion having said inner end and a rearward portion having said outer end, the forward portions extending downwardly and rearwardly from said lure body bottom and in opposing directions away from said lure body, the rearward portions extending generally paralleled to each other and to said hook shank portion, said spinners being affixed to each of said rearward portions adjacent said outer ends.

4. A fishing lure according to claim 1 wherein said hook pointed end extends substantially in the direction towards said eyelet.

5. A fishing lure according to claim 1 wherein said hook curved portion is adaptable to receive a puncturable bait thereon.

6. A fishing lure according to claim 1 wherein said body lure is configured to simulate the head portion of a selected marine life.

* * * * *